United States Patent Office 2,974,450
Patented Mar. 14, 1961

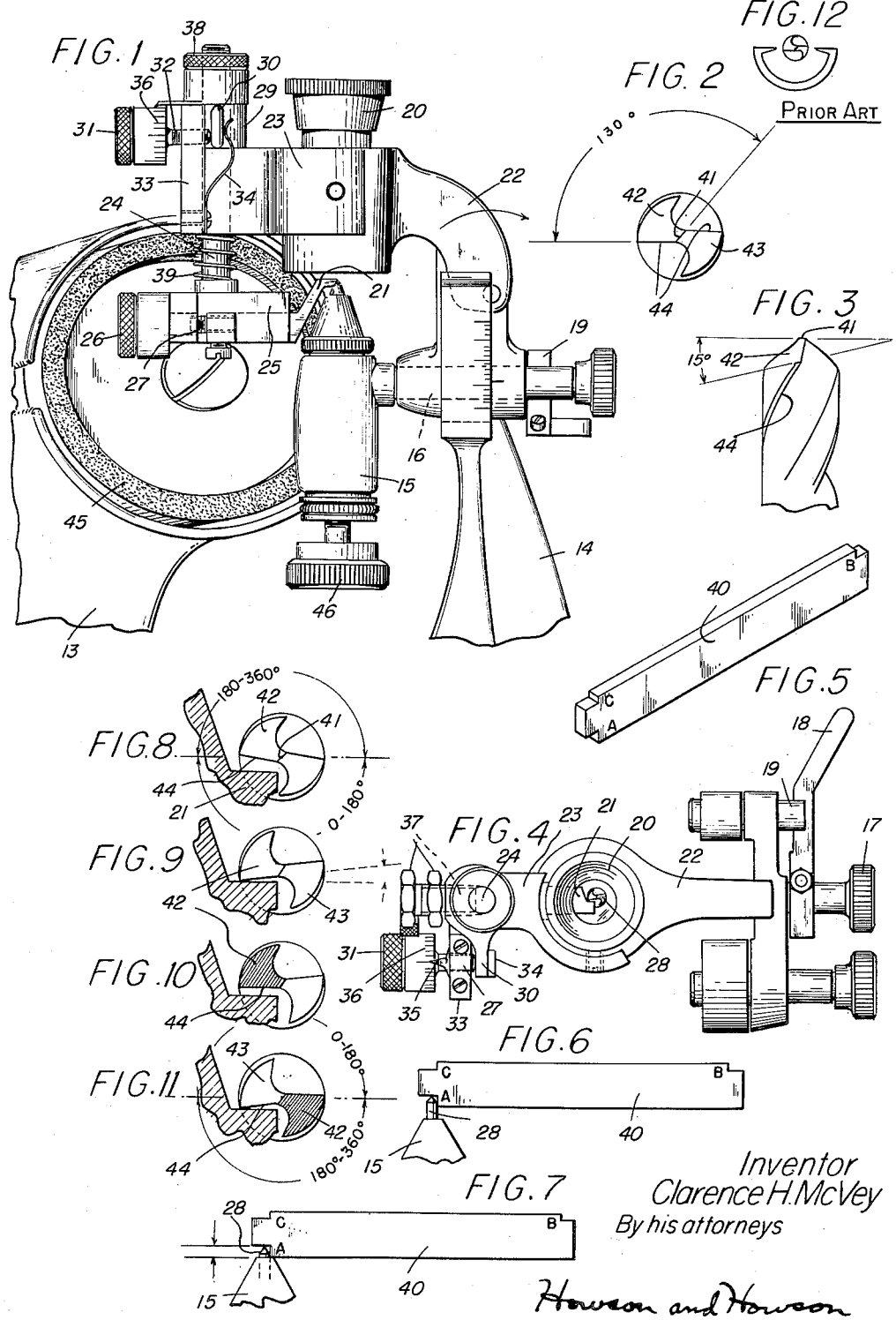

2,974,450

TWIST DRILL SHARPENING MACHINE AND METHOD

Clarence H. McVey, Laconia, N.H., assignor to Scott & Williams, Incorporated, Laconia, N.H., a corporation of Massachusetts Filed Dec. 20, 1956, Ser. No. 629,644

3 Claims. (Cl. 51—219)

This invention relates to a grinding machine for sharpening twist drills and method of operating such a machine. It is particularly useful with the smaller sizes of drills. Twist drills for metal are made with an included angle at the point of about 118°. This angle is usually formed by grinding flat faces or lips 42, 43 as shown in Fig. 2 of the drawings. This produces a clearance angle at the periphery of the drill of about 15° (see Fig. 3). If the drill has two flutings, there will be two faces or lips, Where these join, they form a chisel line 41 across the end of the drill (see Fig. 2). The chisel line must be kept at a uniform angle with regard to the cutting edges 44. In the example shown in Fig. 2 of the drawing, this angle is about 130°. Each fluting is shaped in cross-section with one straight-line edge, which is known as the cutting edge, and one curved edge. Twist drills may have the fluting rotating either counterclockwise or clockwise. The examples shown in the drawings show them rotating in a clockwise direction, as viewed from the cutting end of the drill.

When twist drills are dull it is difficult to grind them accurately, particularly in the smaller sizes ranging in diameters from No. 80 (.013 inch) to No. 31 (.120 inch). Heretofore it has been necessary to depend largely on the skill of the operators to grind them correctly. It is the object of the present invention to provide a machine which can grind these small sizes accurately and easily. It is characteristic of machines constructed in accordance with the invention that a novel adjustable drill stop and associated means are provided which position the drill correctly in the rotary direction regardless of the size of the drill. These means include a cooperative gauge to position the drill axially, both gauge and stop predetermining their settings according to the size of the drill on the basis of a chart.

In the drawings, Fig. 1 is a view in elevation of a grinding wheel and part of the head of a sharpening machine made in accordance with my invention.

Fig. 2 is a view of a two-lip drill from the cutting end showing the included angle at the point.

Fig. 3 is a view in elevation of the end of the drill of Fig. 2 showing the clearance angle.

Fig. 4 is a plan view of the magnifying glass and associated parts of the machine of Fig. 1 when the drill is turned into the vertical position for inspection and adjusting.

Fig. 5 is a perspective view of the gauge to set the drill in the proper axial position with relation to the chuck, the part being shown in inspection position.

Fig. 6 shows the gauge of Fig. 5 applied to the end of the drill.

Fig. 7 shows the same gauge after it has pushed the drill down to the proper axial position.

Fig. 8 is a view in plan of the drill stop for determining the proper angular position of the drill in the chuck before the positioning rotation of the drill is begun.

Fig. 9 is a view similar to Fig. 8 showing the drill with the first lip 42 positioned by the stop preparatory to grinding.

Fig. 10 is a similar view showing the first lip after having been ground.

Fig. 11 is a view similar to Fig. 10 with the drill rotated through 180°, bringing the unground lip 43 into position to be ground.

Fig. 12 is a plan view looking through the magnifying glass of a prior art grinder not containing my invention.

One type of drill sharpening or grinding machine heretofore known has a cylinder grinding wheel with an end grinding face to which the tip of the drill is presented at an angle. This angle is such as to grind one cutting lip at a time as the grinding cylinder is moved to and fro past the drill. This is what is known as flat clearance grinding and not the subsequent relief grinding. In the prior art sharpening machine there is a chuck for holding the drill, and this chuck is adapted to be swung to a horizontal position for grinding or to an upright position in which the operator, looking through a magnifying glass, has an enlarged end-view of the drill. The spindle of the chuck is provided with a loose bushing having two detents spaced 180° apart to enable the two faces or lips to be ground in succession. After the drill has been secured and the chuck rotated to the desired angular position, the bushing is clamped thus locking it to the housing. After this has been done, the chuck is swung down into horizontal or grinding position and one edge of the grinding cylinder is caused to reciprocate over and back against the drill, thus sharpening the first lip. The chuck is then rotated out of its notch until the opposite notch is engaged by the detent, whereupon the second lip is ground.

In this prior art machine the following means are provided to locate the drill in the proper rotary position in the chuck. Below the fixed magnifying glass are two fixed points facing toward each other on an imaginary line passing through the drill's axis (see Fig. 12). When the operator is locating the drill he first places it in the chuck with the bushing loose. He then rotates the chuck and watches through the magnifying glass until the cutting edges of the lips lie parallel to the imaginary line extending between the above-mentioned points. The bushing is then tightened and the first lip can be ground. It has been found that this is not satisfactory due to variations in the flutings of the drill and the inability to visually duplicate settings, particularly the equal and parallel relation. The machine as thus built does not always result in the drill being in the proper rotary position to have the cutting lips ground in the correct relation to the chisel line on the tip of the drill. Applicant has further noted that the correct angular setting of the drill in the chuck should vary slightly according to the size of the drill and that the extent to which the drill projects from the chuck must also be correct for the size of the drill to give the correct included angle. Thus if the drill is gripped in the chuck with too much of its tip projecting, the wheel will grind too much metal off the cutting lip.

While it has been known to be desirable that only the minimum amount of metal be removed from the drill at one passage of the grinding wheel past the lip, applicant also has found that because the flutings are spiralling around the drill, the wrong amount of metal ground off the end of the drill also affects the included angle at the drill tip adversely. This is true even though the amount taken off one face is equal to that taken off the other face. The explanation is as follows: When the proper clearance angle at the tip of the drill has been determined (see Fig. 3 as to what is the clearance angle), the angle of the chisel point or line across the end of the web relative to each cutting edge is also thereby determined. (This included angle is shown in Fig. 2 as 130°.) If the two faces or lips are ground off too far, the ends of the flutes and therefore their cutting edges are in effect rotated out of position without any change in the position of the chisel line. Thus the angle between the chisel and either cutting edge is no longer 130°. Furthermore, the amount the flutes rotate per unit of length of the drill varies according to the diameter of the drill.

It is also important to make the lips of equal length. Otherwise, the drill will run out and the hole will be larger than the drill. My invention ensures that this does not happen.

My invention will be described and embodied in and used in connection with the prior art grinder above referred to.

The prior machine and mine have a cylindrical grinding wheel 45 adapted to rotate in a carrier arm 13 pivotally mounted on the base of the machine. The grinding wheel and part of the arm are shown in Fig. 1. Also mounted on the base is a head 14 carrying the chuck 15. The chuck 15 is mounted on one end of a shaft 16 passing through the upper end of the head 14. There is an operating knob 17 on the outer end of the shaft. This can be seen in Fig. 4. The operating knob 17 has a finger extension 18 which is a convenient means of turning the shaft 16 and thereby turning the chuck from grinding position to an upright position. There is a stop 19 in Fig. 5 engaging the extension 18 to determine the inspecting position. A similar stop 47 is provided for the down or grinding position. This stop 47 actually is a point on the shaft 16 carrying the chuck.

On the upper end of the head is a magnifying glass 20 carried by a pivoted bracket 22 which, when in its operating position, shown in Fig. 4, directly overlies the chuck and drill tip when the latter are in their inspecting position. This enables the operator to see the drill tip magnified. In the prior art machine there are two points facing toward each other underneath the magnifying glass identifying an imaginary line for determining the proper rotary position of the drill in the chuck (see Fig. 13).

In the machine in accordance with my invention, these points are eliminated and a drill stop 21, constructed and operated as hereinafter described, is used. It is a longitudinal blade with a drill lip positioning notch as shown in plan in Figs. 4 and 8–11. This drill stop is carried on the magnifying glass bracket 22 by a frame 23 bolted around the bracket. This drill stop 21 is mounted in an adjustable and visible manner below the frame. For this purpose there is a vertical spindle 24 in the frame 23 extending downwardly to a lower plate 25. The drill stop is movable lengthwise toward and from the field of vision of the microscope as follows: There is a horizontal knob 26 with a threaded extension 27 on the lower plate 25 pressing against the back end of the drill stop 21. The knob has a fixed axial relation to the lower plate 25. It is possible by turning this knob 26 to move the end of the stop 21 longitudinally across the end of the drill 28 without causing any movement of the spindle 24.

In order to provide the correct rotary position of drills of different sizes in the chuck, I find that the drill stop 21 should also be able to turn angularly through a small arc with relation to the drill. This is done by causing controlled rotation of the spindle 24. This rotation of the spindle 24 is obtained from a knob 31 mounted on a vertical plate 33 on the frame 23. There is an extension of the knob 32 threaded through the plate 33 and extending beyond the plate on the far side (see Figs. 1 and 4). On the spindle 24, resting on top of the frame 23, is a ring 29 with a stub arm 30 extending outwardly into contact with the threaded extension of the knob. Pressing against the other side of the stub arm to keep the latter in engagement with the threaded extension is a spring finger 34 also carried by the vertical plate 33. Rotation of the knob 31 turns the stub arm and causes limited turning of the spindle 24. To assist in operating the knob there is a pointer 35 on the vertical plate 33 and graduation marks 36 on the knob 31. Turning of the spindle turns the drill stop 21 toward or away from the axis of any drill in the chuck. Thus the position of the stop can be adjusted to contact the cutting edges of the flutings of drills of different diameters. The spindle 24 is flattened on one side and a screw and lock nut means 37 are provided on the ring 29 to engage the flat on the spindle. The flat on the spindle is slightly longer vertically than the screw and lock nut means. By this means the spindle can be moved vertically without disturbing the rotational setting.

The necessity for vertical adjustability of the spindle arises as follows: The angular setting of the drill is determined by the point of contact between the flutings of the drill and the drill stop. Since the flutings are spiral, the distance from the end of the drill at which the stop contacts the cutting edge affects the angular position at which the drill is fastened in the chuck and therefore the angle of the chisel line relative to the grinding wheel. The new lip which is ground is always at the same angle relative to the chuck regardless of the position of the chisel line. However, the cutting edge may be ground at the wrong angle with relation to the chisel line if the stop engages the drill at the wrong distance from the end of the drill. There is a nut 38 threaded on the spindle 24 above the ring 29 (see Fig. 1). By turning this nut, the spindle 24 can be raised or lowered. A compression spring 39 is provided between the lower face of the frame 23 and the upper side of the lower plate 25. This ensures that the nut 38 stays down in contact with the ring 29.

It is important that the tip of the drill project from the chuck 15 the correct distance so that too much metal will not be taken off by the grinding wheel. To this end, I provide a drill setting gauge 40 which, in the particular embodiment shown, is a separate piece of metal (see Fig. 5). The gauge has one or more notches, A, B and C, and is used in the manner illustrated in Figs. 6 and 7. Assuming for the moment that it is correct to have the tip of the drill project beyond the jaws of the chuck to the extent represented by the depth of the notch A, that notch is laid on the tip of the drill before the jaws of the chuck are tightened. The setting gauge is pressed downwardly until the gauge touches the jaws of the chuck. In this way the exact amount of projection of the tip of the drill is determined by the notch as shown in Fig. 7. Once this amount of projection has been fixed, the chuck is tightened by turning the knurled knob 46 under the chuck.

I have found that the amount which the drill should project varies periodically through the range of drill sizes. For example, I have found that in working with drill sizes from drill No. 31 (which is .120 inch in diameter) to drill No. 80 (which is .013 inch in diameter), three different extents of projection of the end of the drill beyond the jaws of the chuck are required to locate the drill axially in an accurate manner with relation to the grinding surface of the wheel.

I therefore list below the settings in the machine necessary to have each of the different drill sizes project the proper amount beyond the jaws of the chuck. These different settings are identified as notches or steps A, B and C on the drill end setting gauge as previously mentioned. This chart also lists the adjustment of the drill stop for each drill size to give the correct rotary setting of the drill with relation to the grinding wheel. These are identified in the chart as "set knob No. 31 to graduation." This is the knob which causes controlled rotation of the spindle 24 and therefore changes the angular position of the gauge about its own axis and relative to the drill. It will be noted in both instances that any one setting can be used for a plurality of different drill sizes.

Set clearance angle at 15°. Adjust nut "38" to position drill end.
Adjust screw "26" to position drill lip

| Drill No. | Set Drill End to Step | Set Knob 31 to Graduation | Drill No. | Set Drill End to Step | Set Knob 31 to Graduation |
|---|---|---|---|---|---|
| 31 | A | 13 | 56 | B | 20 |
| 32 | A | 13 | 57 | B | 20 |
| 33 | A | 13 | 58 | B | 20 |
| 34 | A | 13 | 59 | B | 21 |
| 35 | A | 13 | 60 | B | 21 |
| 36 | A | 13 | 61 | B | 21 |
| 37 | A | 14 | 62 | B | 22 |
| 38 | A | 14 | 63 | B | 22 |
| 39 | A | 14 | 64 | B | 22 |
| 40 | A | 14 | 65 | B | 23 |
| 41 | A | 15 | 66 | B | 23 |
| 42 | A | 15 | 67 | B | 23 |
| 43 | A | 16 | 68 | B | 23 |
| 44 | A | 16 | 69 | B | 24 |
| 45 | A | 17 | 70 | C | 24 |
| 46 | A | 17 | 71 | C | 24 |
| 47 | A | 18 | 72 | C | 24 |
| 48 | A | 18 | 73 | C | 24 |
| 49 | A | 18 | 74 | C | 24 |
| 50 | A | 18 | 75 | C | 24 |
| 51 | B | 18 | 76 | C | 24 |
| 52 | B | 18 | 77 | C | 24 |
| 53 | B | 19 | 78 | C | 24 |
| 54 | B | 19 | 79 | C | 24 |
| 55 | B | 19 | 80 | C | 24 |

By means of this chart the angular setting on the axis of the drill which keeps the chisel line at the correct angle with relation to the flutings and the correct axial projection of the drill with relation to the grinding wheel are both accurately located. In this way the invention makes possible rapid and accurate sharpening of small sizes of drills. It is particularly useful to have these settings when a number of drills of one size are to be sharpened at the same time.

Having described the construction of my machine, I will now describe a typical grinding operation. The chuck 15 is turned to its inspecting position and the drill 28 to be sharpened is placed loosely in the chuck. By reference to the chart the correct notch A in the drill end setting gauge is chosen and that notch is applied to the end of the drill in the manner shown in Figs. 6 and 7. When the drill has been pushed in until it projects the proper amount, as shown in Fig. 7, the jaws of the chuck are tightened. The angular position of the drill stop 21 is set at the proper graduation for that size of drill by rotation of the knob 31. The operator then looks through the magnifying glass and rotates the chuck on its own axis until one of the cutting edges of the flutings contacts the measuring surface of the gauge (see Fig. 9). The bushing is now locked to the spindle or shaft 16. After this is done, the angular and axial position of the drill is determined and the finger extension 18 can be used to turn the chuck down from inspecting to grinding position. It will be found that the tip of the drill now projects into the path of the wheel 45 the proper amount to insure that the chisel line 41 will, after grinding, still be located in a position where it passes through the axis of the drill and that the proper angular relation between the cutting edge 44 and the chisel line is maintained.

After the grinding wheel has been moved to its reciprocating path across and back in front of the drill, it will be found that the first cutting lip has been accurately ground to give the proper included cutting edge angle of 130° and the proper clearance angle of 15°.

If the chuck is turned up to the inspection position after grinding the lip 42 it will be found that the appearance of the drill stop and the drill corresponds to that shown in Fig. 10. The space appearing between the drill stop and the fluting of the drill is due to the fact that grinding off of the first lip 42 has brought the cutting edge 44 of the fluting around a small distance circumferentially. The chuck is turned out of one notch 180° about its own longitudinal axis until the bushing is held by the second detent notch. The drill is now correctly positioned for the grinding of the second cutting lip 43, as shown in Fig. 11 of the drawings. The chuck is then turned down into operating position, the grinding wheel reciprocated on its carrier arm past the point of the drill across the second cutting lip, and the grinding of this drill is complete.

It will be noted in Figs. 8–11 that the contact edge of the stop 21 is not shown on a line with the axis of the drill. To emphasize the idea further, the example shown is one in which the surface of the drill lip positioning stop 21 even lies below the end of the chisel line 41 on the end of the drill. It will be noted that in this example it is only the outer edge of the fluting which contacts the surface of the stop. This avoids difficulty due to irregularities in the fluting and makes the establishment of contact easy and positive. The contact is between the peripheral edge of the fluting and the stop rather than a general surface contact or one where contact is made near the chisel line but not at the periphery. It will be seen that with the stop not in line with the axis of the drill, adjustments of the distance from the axis to the stop are in order when there are variations in the sizes of the drills to be sharpened.

For an example, if the knob 31 is turned until its graduation mark 16 is opposite the pointer 35 a .040" diameter drill in the chuck should just contact the surface of the drill. As far as concerns the axial projection control the notches in the gauge 40 may, for example, be A $3/32"$, B $1/16$, C $3/64$, etc. The device which I have described also takes care of any variations in the flutings and avoids the necessity of relying on a visual positioning of the drill.

I claim:

1. A method of operating a twist drill sharpening machine having a grinding wheel, a chuck for holding the drill and a stop to bring the cutting edges of the drill in position for grinding new lips in proper relation to the chisel line, comprising the steps of placing the drill to be ground in the chuck, pushing the drill into the chuck with a gauge by a notch therein preset in depth according to the diameter of the drill, locking the drill in the chuck with a projection determined by the notch, adjusting the stop radially and angularly of the axis of the drill according to a chart according to the diameter of the drill, turning the drill till one of its cutting edges makes point contact with the stop, locking the drill against rotation and thereafter grinding new lips on the drill, whereby the lips will be at preset angular relation to the chisel line on the drill.

2. In a twist drill sharpening machine having a grinding wheel, a chuck for holding the drill, a head adapted to hold the chuck in position to cause the grinding of lips on the end of the drill, said head permitting the chuck to turn between grinding and inspecting positions, the provision of means to bring the cutting edges of the drill in position for grinding new lips in predetermined relation to a chisel line on the end of the drill, said means including a drill stop on the head having preset graduations adapted to fix the rotary position of the stop relative to the flutings of the drill, said stop also being adjustable radially of the drill by independent preset graduations to correspond with the flutings of the drill in a predetermined manner, a spindle on the head in combination with graduated means for angular adjustment thereof relative to the drill for giving limited turning of the spindle to predetermine the angular position of the stop relative to the axis of the drill by turning the stop toward or away from the axis of the drill before sharpening the drill.

3. In a twist drill sharpening machine having a grinding wheel, a chuck for holding the drill, a head adapted to hold the chuck in position to cause the grinding of lips on the end of the drill, said head permitting the chuck to turn between grinding and inspecting positions, the provision of means to bring the cutting edges of the drill in position for grinding new lips in predetermined relation to a chisel line on the end of the drill, said means including a drill stop on the head having preset graduations adapted to fix the rotary position of the stop relative to the flutings of the drill, said stop also being adjustable radially of the drill by independent preset graduations to correspond with the flutings of the drill in a predetermined manner, a spindle on the head in combination with graduated means for angular adjustment thereof relative to the drill for giving limited turning of the spindle to predetermine the angular position of the stop relative to the axis of the drill by turning the stop toward or away from the axis of the drill before sharpening the drill, and means for adjusting the stop vertically of the drill.

References Cited in the file of this patent

UNITED STATES PATENTS

| | | |
|---|---|---|
| 604,306 | Walker | July 12, 1898 |
| 614,092 | Eames | Nov. 15, 1898 |
| 1,714,136 | Probert et al. | May 21, 1929 |
| 2,024,268 | Bausch et al. | Dec. 17, 1935 |
| 2,596,916 | Raney | May 13, 1952 |
| 2,785,510 | Garrison | Mar. 19, 1957 |
| 2,797,533 | Bluemink | July 2, 1957 |
| 2,805,522 | Dayton | Sept. 10, 1957 |
| 2,827,741 | Hillier | Mar. 25, 1958 |